United States Patent
Zheng et al.

(10) Patent No.: US 9,964,689 B2
(45) Date of Patent: May 8, 2018

(54) BACKLIGHT ASSEMBLY AND DISPLAY DEVICE

(71) Applicants: BOE Technology Group Co., Ltd., Beijing (CN); Beijing BOE Display Technology Co., Ltd., Beijing (CN)

(72) Inventors: Hui Zheng, Beijing (CN); Dongxi Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/500,610

(22) PCT Filed: Jul. 11, 2016

(86) PCT No.: PCT/CN2016/089621
§ 371 (c)(1),
(2) Date: Jan. 31, 2017

(87) PCT Pub. No.: WO2017/067242
PCT Pub. Date: Apr. 27, 2017

(65) Prior Publication Data
US 2017/0269286 A1 Sep. 21, 2017

(30) Foreign Application Priority Data
Oct. 19, 2015 (CN) .......................... 2015 1 0675574

(51) Int. Cl.
*G02B 6/00* (2006.01)
*F21V 8/00* (2006.01)

(52) U.S. Cl.
CPC .................................. *G02B 6/0068* (2013.01)

(58) Field of Classification Search
None
See application file for complete search history.

(56) References Cited

U.S. PATENT DOCUMENTS

| 2004/0085747 A1* | 5/2004 | Yamamoto | G02B 6/0068 362/614 |
| 2006/0139963 A1 | 6/2006 | Chang et al. | |
| 2009/0290381 A1 | 11/2009 | Liu et al. | |

FOREIGN PATENT DOCUMENTS

| CN | 101865402 A | 10/2010 |
| CN | 201652140 U | 11/2010 |

(Continued)

OTHER PUBLICATIONS

International Search Report and Written Opinion of International Application No. PCT/CN2016/089621, dated Oct. 14, 2016, 9 pages.

(Continued)

*Primary Examiner* — Britt D Hanley
(74) *Attorney, Agent, or Firm* — Westman, Champlin & Koehler, P.A.

(57) ABSTRACT

Embodiments of the present invention disclose a backlight assembly including a backlight housing, a light source holder and a plurality of light sources. The light source holder is mounted to the backlight housing in such a way that the light source holder is rotatable about a central axis X thereof. The light source holder is further provided with at least two light source mounting grooves arranged at an angular interval around the central axis, and each light source mounting groove is configured to mount at least one of the plurality of light sources therein. With this backlight assembly, it is possible to realize replacement of the backlight source without disassembling the backlight assembly by rotating another or other light source to an operating position by rotation of the light source holder.

20 Claims, 5 Drawing Sheets

(56) References Cited

FOREIGN PATENT DOCUMENTS

| | | |
|---|---|---|
| CN | 203549549 U | 4/2014 |
| CN | 105137657 A | 12/2015 |
| TM | M270374 U | 7/2005 |

OTHER PUBLICATIONS

English translation of Box No. V of the Written Opinion for the International Searching Authority for International Application No. PCT/CN2016/089621, 1 page.
First Office Action from Chinese Patent Application No. 201510675574.3, dated Sep. 13, 2017, 9 pages.

* cited by examiner

BACKLIGHT ASSEMBLY AND DISPLAY DEVICE

CROSS-REFERENCE TO RELATED APPLICATION

This application is a national phase application from PCT/CN2016/089621 filed on Jul. 11, 2016 and claims the benefit of Chinese Patent Application No. CN201510675574.3 filed on Oct. 19, 2015 in the State Intellectual Property Office of China, the whole disclosure of which is incorporated herein by reference.

BACKGROUND OF THE INVENTION

Field of the Invention

Embodiments of the present invention relate to the field of display technique, in particular to a backlight assembly for a LCD display and a display device including the same.

Description of the Related Art

A liquid crystal display has been widely used due to its advantageous such as thin structure, no radiation, low power consumption and the like. However, since the liquid crystal panel can not emit light itself, it is necessary to provide a backlight source for a liquid crystal panel to improve brightness of the liquid crystal display.

According to different positions of the backlight source, a backlight of the liquid crystal display may be classified as side light type or straight light type. In the straight light type backlight, the backlight source is provided under the liquid crystal panel (the rear thereof), and lights emitted from the backlight source will directly pass through the liquid crystal panel. In the side light type backlight, the backlight source is provided at a side of the liquid crystal panel, and an incident light from the side will be transmitted through the liquid crystal panel and exit outside after being diverted through a light guide plate and a back plate (or a backlight housing).

In order to satisfy the use's demand for an ultrathin liquid crystal television, the existing backlight is typically the side light type, and a LED (Light-Emitting Diode) is used as the backlight source. A LED bar including a plurality of LEDs are disposed on a side of the light guide plate. However, a fixing structure for the LED bar is usually relatively simple, and is simply fixed to a back plate with a double sided adhesive tape. Therefore, if a circuit board included in the LED bar is broken or a LED is broken, the LED of the LED bar can not be normally lighted. At this time, the service may be done only by disassembling the liquid crystal backlight, removing the broken LED bar, cleaning the surface residual adhesive, and then replacing a new LED bar. This service is tedious and time cost. Further, this service may cause other associated components not able to be used again, which may result in waste to certain degree.

SUMMARY OF THE INVENTION

An object of the present invention is intended to provide a backlight assembly and a display device having the same to overcome at least part of the above defects in the art.

According to an aspect of the present invention, there is provided a backlight assembly.

In an exemplary embodiment of the present invention, the backlight assembly comprises a backlight housing, a light source holder and a plurality of light sources, wherein the light source holder is mounted to the backlight housing in such a way that the light source holder is rotatable about a central axis thereof, and the light source holder is further provided with at least two light source mounting grooves arranged at an angular interval around the central axis, and each light source mounting groove is configured to mount at least one of the plurality of light sources therein.

In another exemplary embodiment of the present invention, the backlight housing comprises two side walls located on two axial ends of the light source holder, respectively, and the light source holder is in an interference fit with the two side walls.

In further another exemplary embodiment of the present invention, the backlight assembly further comprises a manipulating member configured to enable the light source holder to rotate about the central axis.

In yet another exemplary embodiment of the present invention, the manipulating member comprises a knob coupled with the light source holder along the central axis.

In still another exemplary embodiment of the present invention, the light source holder comprises a hole recessed from each axial end of the light source holder along the central axis, and the knob comprises a manipulating portion and an elongated extension extending from the manipulating portion and configured to be in an interference fit with the hole In further another exemplary embodiment of the present invention, the light source holder comprises an elongated extending portion extending from each axial end of the light source holder along the central axis, and the knob is provided with a hole configured to be in an interference fit with the elongated extending portion.

In yet another exemplary embodiment of the present invention, the knob further comprises a plurality of radial protrusions formed on the elongated extension, and the hole of the light source holder is shaped to accommodate the elongated extension and the radial protrusions.

In still another exemplary embodiment of the present invention, the knob further comprises a plurality of radial protrusions formed on the elongated extension, the backlight housing has an aperture at a side wall thereof shaped to accommodate the elongated extension, and the aperture at the side wall has a plurality of cutouts corresponding to the plurality of radial protrusions of the knob such that the plurality of radial protrusions are adapted to be retained in the plurality of cutouts respectively.

In further another exemplary embodiment of the present invention, the radial protrusions of the knob comprise a plurality of teeth made of flexible material and spaced apart from each other at an equal angular interval along an outer periphery of the elongated extension, and there is a gap between a wall of the aperture at the side wall and an outer peripheral surface of the elongated extension of the knob such that the plurality of teeth are able to be elastically deformed to enter the gap during rotation of the knob and enter the plurality of cutouts again and revert to their un-deformed state after the knob is rotated over a predetermined angle.

In yet another exemplary embodiment of the present invention, the backlight assembly further comprises a light source control member for controlling an ON-OFF state of the plurality of light sources.

In still another exemplary embodiment of the present invention, the light source control member comprises a trigger device configured to be triggered when the light source holder or the knob is rotated to a predetermined angle.

In further another exemplary embodiment of the present invention, light sources mounted within different light source mounting grooves of the light source holder have different optical properties from each other.

According to a second aspect of the present invention, there is provided a display device comprising the backlight assembly according to any one of the embodiments as described above.

With the backlight assembly and the display device according to the embodiments of the present invention, it is possible to mount two or more backlight sources on the light source holder of the backlight assembly such that one of the light sources can be rotated to an operating position through rotating the light source holder when another light source can not emit light due to failure so as to realize replacement of backlight source without disassembling the backlight assembly.

BRIEF DESCRIPTION OF THE DRAWINGS

Preferred embodiments of the present invention will be described below by way of example with reference to accompanying drawings in which.

DETAILED DESCRIPTION OF PREFERRED EMBODIMENTS OF THE INVENTION

Embodiments of the present invention will be described in detail below with reference to the accompanying drawings in which the same numerical references denote the same or similar elements throughout the drawings. Note that, the following descriptions are intended to be illustrative and should not be considered to limit the present invention.

According to the general inventive concept of the present invention, there is provided a backlight assembly comprising a backlight housing, a light source holder and a plurality of light sources, wherein the light source holder is mounted to the backlight housing in such a way that the light source holder is rotatable about a central axis thereof, and the light source holder is further provided with at least two light source mounting grooves arranged at an angular interval around the central axis, and each light source mounting groove is configured to mount at least one of the plurality of light sources therein.

Figure 1:
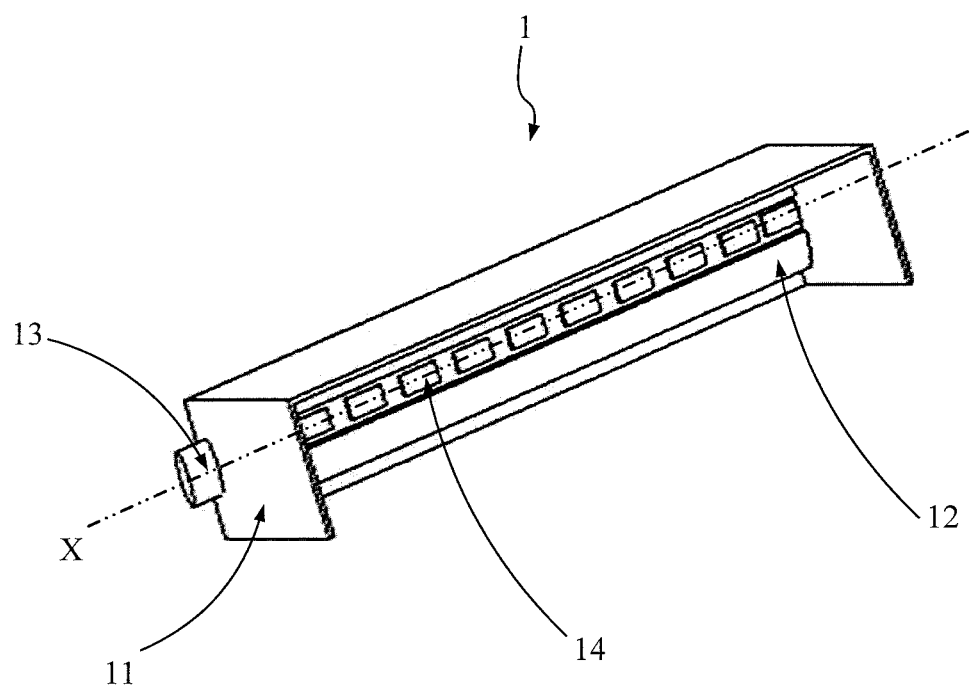
FIG. 1 is a schematic perspective view of a backlight assembly according to an exemplary embodiment of the present invention.
Figure 2:
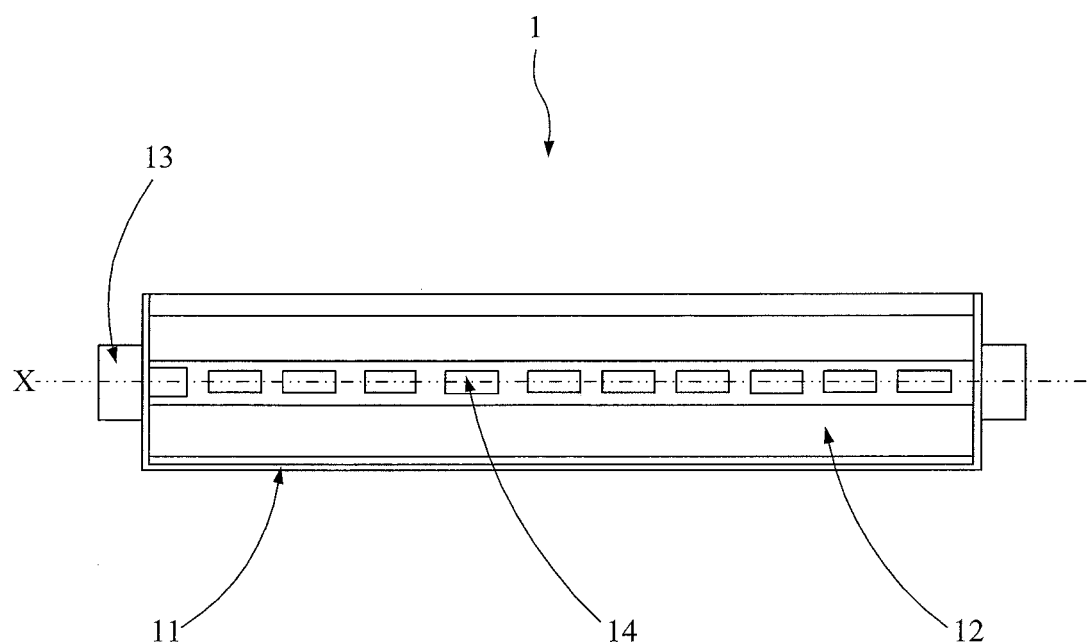
FIG. 2 is a schematic side view of the backlight assembly as shown in FIG. 1.
Figure 3:
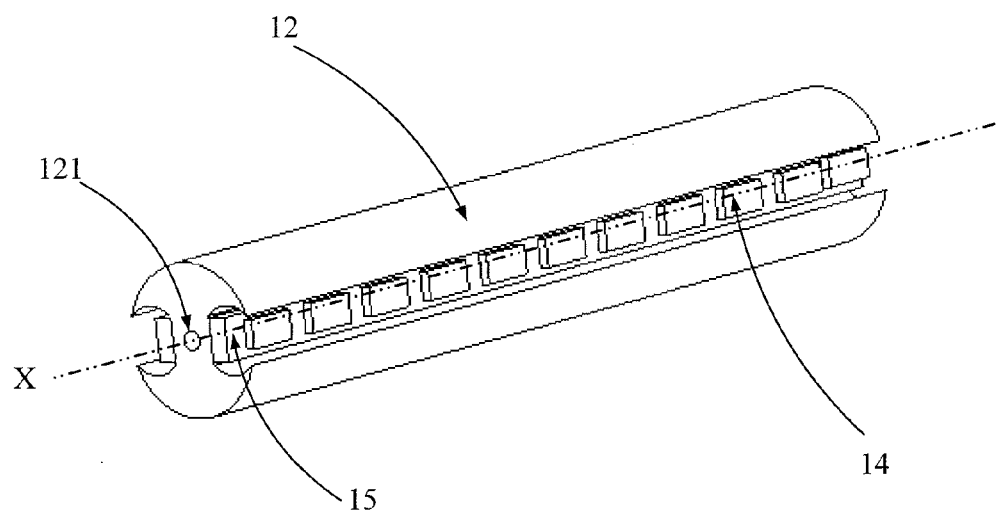
FIG. 3 is a schematic perspective view of a light source holder of the backlight assembly as shown in FIG. 1.
Figure 4:
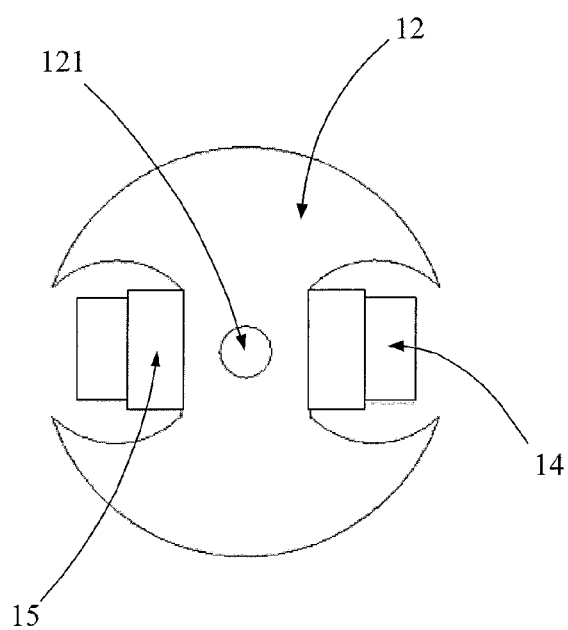
FIG. 4 is a schematic end view of light sources and the light source holder as shown in FIG. 3.

FIGS. 1 to 4 show a backlight assembly according to an exemplary embodiment of the present invention. Specifically, FIG. 1 is a schematic perspective view of a backlight assembly according to an exemplary embodiment of the present invention, FIG. 2 is a schematic side view of the backlight assembly as shown in FIG. 1, FIG. 3 is a schematic perspective view of a light source holder of the backlight assembly as shown in FIG. 1, and FIG. 4 is a schematic end view of light sources and the light source holder as shown in FIG. 3.

As shown in FIGS. 1 and 2, a backlight assembly 1 comprises a backlight housing 11, a light source holder 12 and a plurality of light sources 14. Each light source 14 may include one or more light-emitting elements such as LEDs. The light source holder 12 is mounted to the backlight housing 11 in such a manner that the light source holder 12 is rotatable about a central axis X thereof. The light source holder 12 is further provided with a plurality of light source mounting grooves 120 (for example, two light source mounting grooves are illustrated in the figures) arranged at a certain angular interval around the central axis X (see FIGS. 3 and 4), and each light source mounting groove is configured to mount at least one of the plurality of light sources 14 therein.

With such a backlight assembly, it is possible to mount two or more backlight sources on the light source holder 12 of the backlight assembly such that one of the light sources or other light source can be rotated to an operating position through rotation of the light source holder when another light source can not emit light due to failure so as to realize replacement of the backlight source without disassembling the backlight assembly.

The rotation of the light source holder 12 may be implemented in various ways including, but not limited to, a manual rotating or other automatic or semi-automatic mechanisms. However, in order to reduce cost, the rotation of the light source holder 12 may be implemented through manual rotating, which will be described below with reference to embodiments.

Note that, the light source holder is not only limited to be provided with two light source mounting grooves. The number of the light source mounting grooves may be more than two as desired. As shown in FIGS. 3 and 4, opening directions of the two light source mounting grooves are opposite to each other, i.e, spaced apart from each other circumferentially by 180 degree. However, this is not necessary. The two light source mounting grooves may also be spaced apart from each other by another angular interval. In a case of more than two light source mounting grooves, these light source mounting grooves may be arranged to be spaced apart from each other at an equal angle. For example, in a case where the light source holder includes three light source mounting grooves, the three light source mounting grooves may be arranged to be spaced apart from each other at 120 degree on a periphery of the light source holder. Similarly, in a case where the light source holder includes four light source mounting grooves, the four light source mounting grooves may be arranged to be spaced apart from each other at 90 degree on a periphery of the light source holder.

Although the light source holder is depicted as having a cylindrical shape in FIGS. 3 and 4, this is not necessary. In other embodiments of the present invention, the light source holder may also have a generally triangular prism shape, a quadrangular prism shape or other shapes. For example, in the case where the light source holder includes three light source mounting grooves, the light source holder may have a generally triangular prism shape such that the three light source mounting grooves are arranged in three side surfaces of the triangular prism, respectively.

As shown in FIGS. 1 and 2, the backlight housing 11 comprises two side walls located on two axial ends of the light source holder 12 respectively. The light source holder 12 is in an interference fit with the two side walls of the backlight housing 11. The interference fit herein includes that the light source holder 12 is clamped between the two side walls of the backlight housing 11 through a friction force, for example.

With the interference fit of the light source holder 12 with the two side walls of the backlight housing 11, it is advantageous to secure the light source holder 12 between the two side walls of the backlight housing 11 to prevent an undesired rotation of the light source holder 12 without additional positioning mechanism. However, the light source holder 12 may be rotated against the clamping force of the two side walls of the backlight housing 11 under an appropriate external force.

In order to facilitate rotating the light source holder, according to an exemplary embodiment of the present invention, as illustrated in FIGS. 1 and 2, the backlight assembly 1 further comprises a manipulating member configured to enable the light source holder 12 to rotate about the central axis X. The manipulating member includes a knob 13 coupled with the light source holder 12 along the central axis X.

The knob 13 may be coupled with the light source holder 12 in various ways including, but not limited to the follows.

Figure 5:
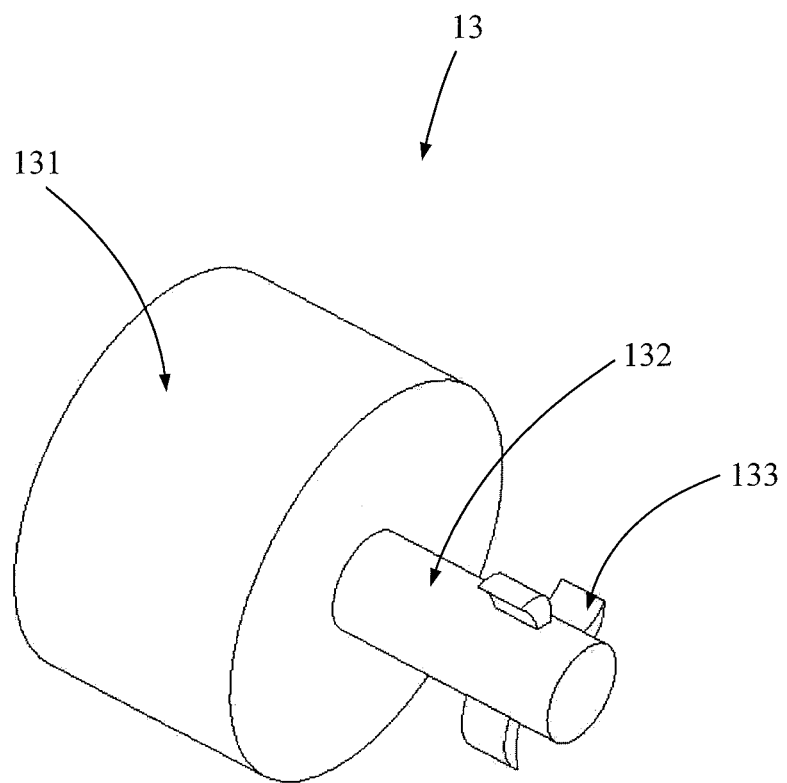
FIG. 5 is a schematic perspective view of an exemplary embodiment of a knob of the backlight assembly as shown in FIG. 1.

In one way, the light source holder 12 may include a hole 121 (shown in FIG. 4) recessed from each axial end of the light source holder along the central axis X, and the knob 13 may include a manipulating portion 131 and an elongated extension 132 (as shown in FIG. 5) extending from the manipulating portion 131 and configured to be in an interference fit with the hole.

In another way, the light source holder may include an elongated extending portion extending from each axial end of the light source holder along the central axis X, and the knob 13 may include a hole configured to be in an interference fit with the elongated extending portion.

By the above ways, it is possible to firmly connect or bond the elongated extending portion of the light source holder (or the elongated extension of the knob) with the hole in the knob (or in the light source holder) through an interference fit between the light source holder and the knob such that the rotation of the knob can drive the rotation of the light source holder.

Although the elongated extension of the knob and the hole of the light source holder each have a circular cross-section, this is not necessary. In other embodiments, they may have a rectangular cross-section to facilitate the knob to exert a rotating force on the light source holder.

Figure 6:
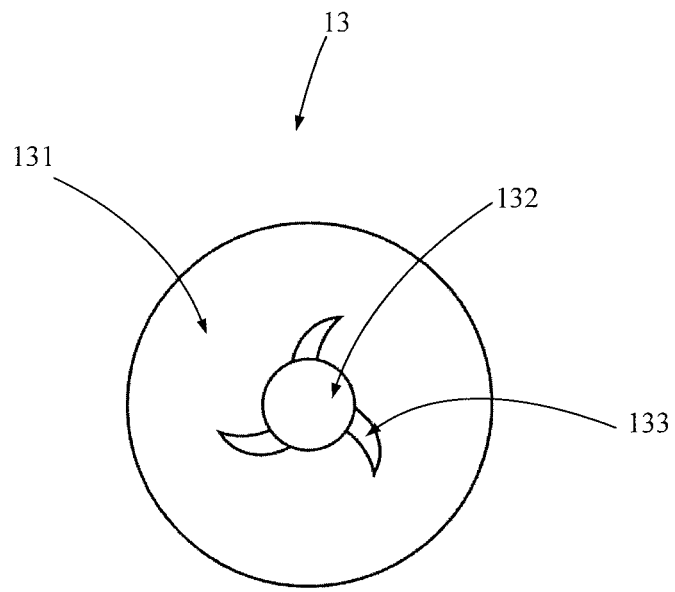
FIG. 6 is a schematic end view of the knob shown in FIG. 5.
Figure 7:
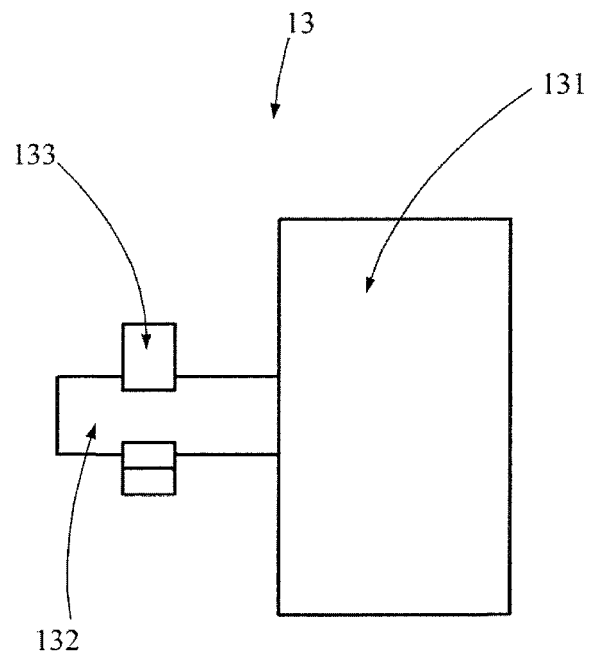
FIG. 7 is a schematic side view of the knob shown in FIG. 5.

As illustrated in FIGS. 5 to 7, in an exemplary embodiment of the present invention, the knob 13 may further include at least one radial protrusion 133 formed on the elongated extension 132. When the rotating force is applied to the light source holder 12 by using the radial protrusion 133, the axial hole in the light source holder may has a shape corresponding to the elongated extension 132 and the radial protrusion(s) 133 of the knob 13, rather than the circular shape illustrated in FIGS. 3 and 4.

In order to smoothly pass the elongated extension 132 and the radial protrusion 133 of the knob 13 through the side wall of the backlight housing 11 into the hole 121 of the light source holder 12, at least one of the side walls of the backlight housing 11 may be provided with an aperture shaped to accommodate the elongated extension 132 and the radial protrusion(s) 133 of the knob 13. For example, the aperture may be provided with a plurality of cutouts spaced apart from each other at an equal angular interval in a cylindrical side wall thereof. These cutouts correspond to the radial protrusions 133 of the knob 13 in shapes and positions.

In an alternative embodiment of the present invention, it is possible that only the elongated extension 132 of the knob 13 is coupled with the light source holder 12 through interference fit, and the radial protrusions 133 may retain in the aperture at the side wall of the backlight housing 11, rather than extending into the light source holder 12. In this embodiment, the aperture at the side wall is substantially same with the elongated extension 132 and the radial protrusion 133 of the knob 13 in size, such that the knob 13 can be retained in the aperture at a predetermined angular orientation to keep an angular orientation of the light source holder 12. When it is necessary to rotate the light source holder 12, the knob 13 may be slightly drawn out from the light source holder 12 such that the radial protrusions 133 of the knob 13 are disengaged from the aperture at the side wall of the backlight housing 11 so as to rotate the knob 13. When the light source holder 12 is rotated to the next retaining angle, the knob 13 is pushed toward the light source holder 12 again such that the radial protrusions 133 of the knob 13 are retained into the aperture of the side wall again.

In another alternative embodiment of the present invention, similarly, only the elongated extension 132 of the knob 13 is coupled with the light source holder 12 through interference fit, and the radial protrusions 133 will not extend into the light source holder 12. However, the radial protrusions 133 of the knob 13 are configured as a plurality of teeth made of a flexible material and spaced apart from each other at an equal angular interval along an outer periphery of the elongated extension, and the aperture at the side wall of the backlight housing 11 is slightly greater than the elongated extension 132 of the knob 13 as a whole so that there is a gap between an outer periphery of the elongated extension 132 of the knob 13 and an inner wall of the hole at the side wall. Meanwhile, a diameter of a circumcircle of the teeth 133 is larger than a diameter of an inscribed circle of the aperture at the side wall of the backlight housing 11 such that the teeth can be retained in the cutouts at the periphery of the aperture, respectively. The plurality of teeth 133 can be elastically deformed during rotation of the knob 13 and revert to their un-deformed state after the knob 13 is rotated by a predetermined angle.

As shown in FIG. 6, since the teeth 133 is made of flexible material, the teeth 133 will be elastically deformed when being blocked by the edges of the cutouts of the aperture at the side wall during the rotation of the knob 13, such that the teeth 133 can bend toward the outer peripheral surface of the elongated extension 132, thereby smoothly passing through the gap between the outer peripheral surface of the elongated extension 132 and the wall of the aperture at the side wall.

Although FIG. 6 shows a particular shape of the radial protrusions (teeth) 133 of the knob 13, the shape thereof is not limited herein. The teeth may have any appropriate shape as long as the teeth can practice the operation mechanism as described above. For example, the teeth 133 may have a shape similar to gear teeth, ratchet tooth or spline teeth.

With the knob 13 having the flexible teeth 133 as described above, it is possible to realize a certain angular orientation of the light source holder 12 while rotating the light source holder 12. The number of the teeth is not limited to three as shown in FIGS. 5 to 7. The number of the teeth may be only two or other number. For example, in the case where the light source holder 12 has three light source mounting grooves arranged at an equal angular interval, the number of the teeth may be three. For another example, in the case where the light source holder 12 has four light source mounting grooves arranged at an equal angular interval, the number of the teeth may be four. In another example, in the case where the light source holder 12 only has two light source mounting grooves arranged at an equal angular interval as shown in FIGS. 1 to 4, the teeth may be two teeth arranged and spaced apart from each other by 180 degree.

In an exemplary embodiment of the present invention, the backlight assembly may further comprise a light source control member for controlling an ON-OFF state of the plurality of light sources. The light source control member may be implemented in various manners in the art including, but not limited to remote control, field manual control, triggering control and so on. A trigger switch may be provided and triggered by movement of the rotating holder or rotation of the knob. For example, the trigger switch may be configured to be triggered when the light source holder or the knob is rotated to a predetermined angle. This may be realized through appropriate design in structure of the light source holder or the knob by those skilled in the art, and the descriptions in detail are omitted herein. With the trigger switch, it is possible to automatically trigger the light source switch when a desired light source is rotated to an position opposite to the light guide plate, such that the desired light source at the position opposite to the light guide plate is illuminated and other light source or sources at other positions is turned off.

According to different or personalized demand of a customer, the plurality of light sources mounted in the light source holder of the backlight assembly according to embodiments of the present invention may have different optical properties from each other including but not limiting to color gamut, color temperature and/or brightness. Therefore, even if all the light sources of the backlight assembly do not occur a failure, it is possible to positively adjust the knob to select a light source having suitable or desired color gamut, color temperature and/or brightness to provide the backlight so as to satisfy requirements of different backlight modes and display modes.

According to another aspect of the present invention, there is also provided a display device comprising the backlight assembly as described in any one of embodiments or examples above.

For the well-known construction such as construction of a light guide plate, a substrate, a color filter, a liquid crystal layer and the like, the description thereof is not particularly set forth herein. In addition, the backlight assembly disclosed in the embodiments of the present invention is applicable not only to a liquid crystal display, but also applicable to other display devices requiring a backlight.

Although preferred embodiments of the present invention have been described in detail by way of examples, it should be appreciated by those skilled in the art various changes or modifications can be made thereto without departing from the spirit and scope of the present invention, and these changes or modifications should fall within the scope of the present invention. Therefore, the scope of the present invention is solely defined by the appended claims.

What is claimed is:
1. A backlight assembly comprising:
a backlight housing;
a light source holder; and
a plurality of light sources, wherein the light source holder is configured to be mounted to the backlight housing in such a way that the light source holder is rotatable about a central axis thereof; and wherein the light source holder is further provided with at least two light source mounting grooves arranged at an angular interval around the central axis, each light source mounting groove being configured to be mounted with at least one of the plurality of light sources therein, and the plurality of light sources are configured such that in operation, the at least one of the plurality of light sources which is mounted in one of the at least two light source mounting grooves emits light and the light source/sources mounted in the rest of the at least two light source mounting grooves is/are turned off while the light source holder remains stationary.

2. The backlight assembly according to claim 1, wherein the backlight housing comprises two side walls located on two axial ends of the light source holder, respectively; and the light source holder is configured to be in an interference fit with the two side walls.

3. The backlight assembly according to claim 1, further comprising a manipulating member configured to enable the light source holder to rotate about the central axis.

4. The backlight assembly according to claim 3, wherein the manipulating member comprises a knob coupled with the light source holder along the central axis.

5. The backlight assembly according to claim 4, wherein the light source holder comprises a hole recessed from each axial end of the light source holder along the central axis, and the knob comprises a manipulating portion and an elongated extension extending from the manipulating portion and configured to be in an interference fit with the hole.

6. The backlight assembly according to claim 4, wherein the light source holder comprises an elongated extending portion extending from each axial end of the light source holder along the central axis, and the knob is provided with a hole configured to be in an interference fit with the elongated extending portion.

7. The backlight assembly according to claim 5, wherein the knob further comprises a plurality of radial protrusions formed on the elongated extension, and the hole of the light source holder is shaped to accommodate the elongated extension and the radial protrusions.

8. The backlight assembly according to claim 5, wherein the knob further comprises a plurality of radial protrusions formed on the elongated extension, the backlight housing is formed with an aperture at a side wall thereof adapted to accommodate the elongated extension, and the aperture at the side wall has a plurality of cutouts corresponding to the plurality of radial protrusions of the knob such that the plurality of radial protrusions are allowed to be retained in the plurality of cutouts respectively.

9. The backlight assembly according to claim 8, wherein the radial protrusions of the knob comprise a plurality of teeth made of flexible material and spaced apart from each other at an equal angular interval along an outer periphery of the elongated extension, and there is a gap between a wall of the aperture at the side wall and an outer peripheral surface of the elongated extension of the knob such that the plurality of teeth are allowed to be elastically deformed to enter the gap during rotation of the knob and enter the plurality of cutouts again and revert to their un-deformed state after the knob is rotated over a predetermined angle.

10. The backlight assembly according to claim 4, further comprising a light source control member for controlling an ON-OFF state of the plurality of light sources.

11. The backlight assembly according to claim 10, wherein the light source control member comprises a trigger device configured to be triggered when the light source holder or the knob is rotated to a predetermined angle.

12. The backlight assembly according to claim 1, wherein the light sources mounted in different light source mounting grooves of the light source holder have different optical properties from each other.

13. A display device, comprising the backlight assembly according to claim 1.

14. The backlight assembly according to claim 2, further comprising a manipulating member configured to enable the light source holder to rotate about the central axis.

15. The backlight assembly according to claim 5, further comprising a light source control member for controlling an ON-OFF state of the plurality of light sources.

16. The backlight assembly according to claim 6, further comprising a light source control member for controlling an ON-OFF state of the plurality of light sources.

17. The backlight assembly according to claim 7, further comprising a light source control member for controlling an ON-OFF state of the plurality of light sources.

18. The backlight assembly according to claim 8, further comprising a light source control member for controlling an ON-OFF state of the plurality of light sources.

19. A display device, comprising the backlight assembly according to claim 2.

20. A display device, comprising the backlight assembly according to claim 3.

* * * * *